May 10, 1932. W. A. ROSS 1,857,403
CUTTING APPARATUS FOR STONE, COAL, AND THE LIKE
Filed March 9, 1925   3 Sheets-Sheet 1
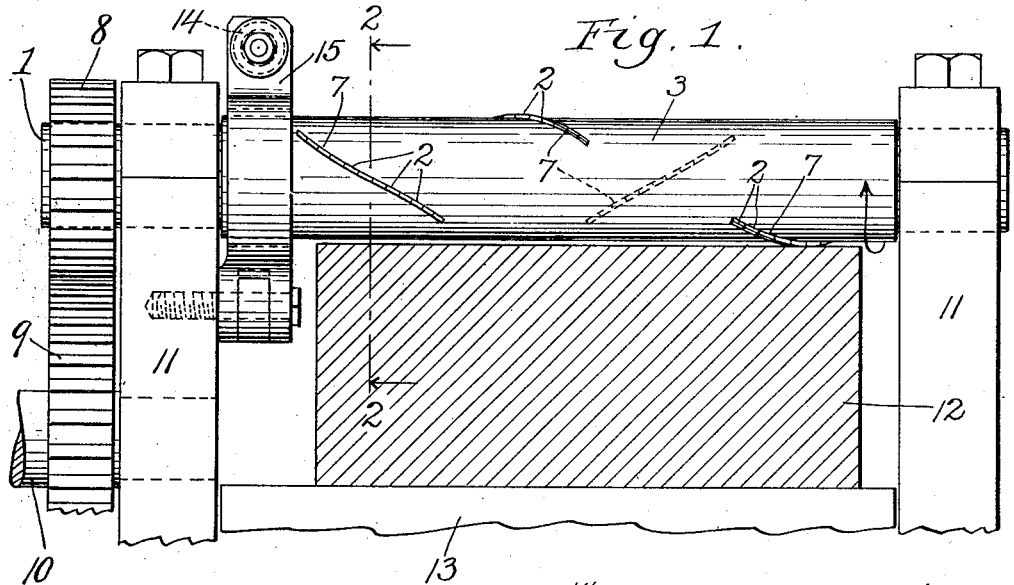
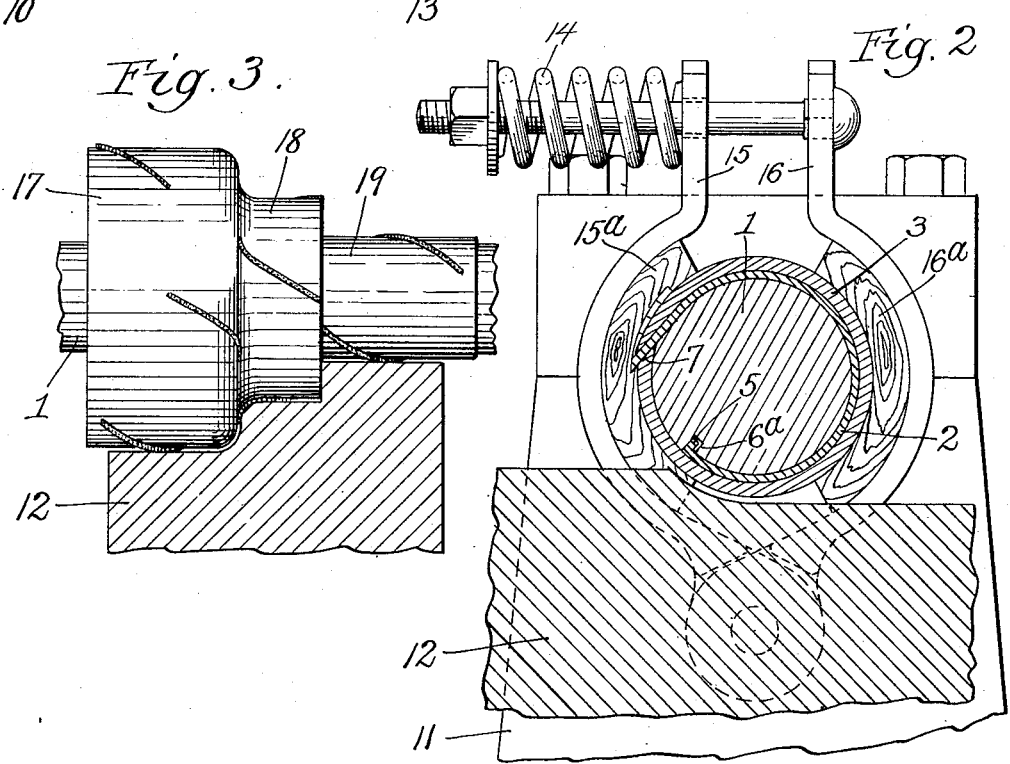
Inventor
Warren A. Ross
by Parker & Carter
Attorneys.

May 10, 1932. W. A. ROSS 1,857,403
CUTTING APPARATUS FOR STONE, COAL, AND THE LIKE
Filed March 9, 1925   3 Sheets-Sheet 2
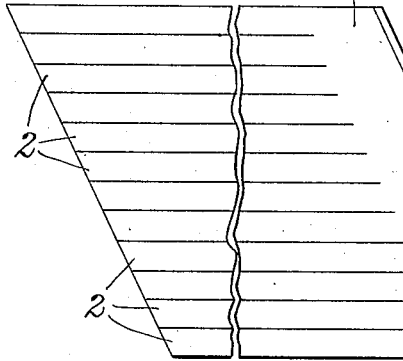
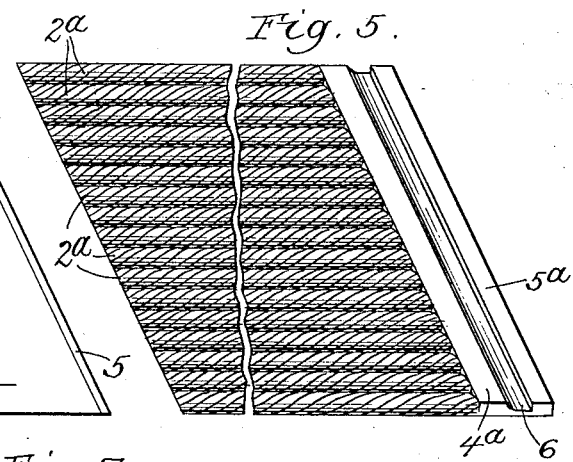
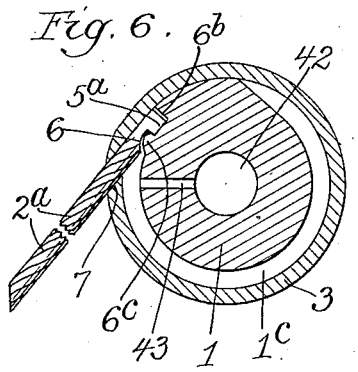
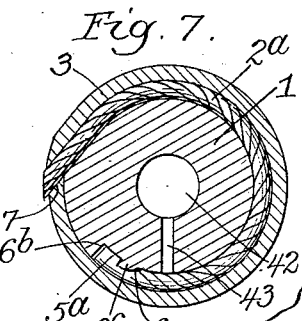
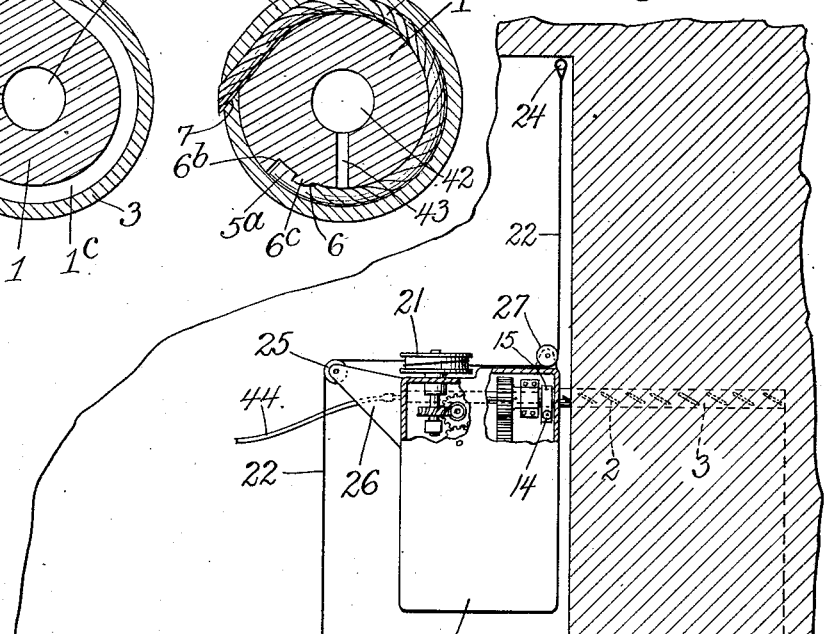

May 10, 1932.    W. A. ROSS    1,857,403
CUTTING APPARATUS FOR STONE, COAL, AND THE LIKE
Filed March 9, 1925   3 Sheets-Sheet 3

Inventor
Warren A. Ross
by Parker Carter
Attorneys.

Patented May 10, 1932

1,857,403

UNITED STATES PATENT OFFICE

WARREN A. ROSS, OF CHICAGO, ILLINOIS, ASSIGNOR OF ONE-FOURTH TO DONALD M. CARTER, OF CHICAGO, ILLINOIS, AND FIVE-EIGHTHS TO TRUMAN O. BOYD, OF LONG BEACH, CALIFORNIA

CUTTING APPARATUS FOR STONE, COAL, AND THE LIKE

Application filed March 9, 1925. Serial No. 13,971.

This invention relates to cutting apparatus for stone, coal, and the like, and has for its object to provide a new and improved apparatus of this description.

The invention has as a further object to provide means for cutting stone, coal, and the like in the process of removing such materials from the earth.

The invention has as a further object to provide an efficient means for cutting or shaping stone or other materials for commercial purposes.

The invention has a further object to provide a cutting means which shall be efficient and wherein the cutters are automatically fed to the material as they become worn.

The invention has further objects which are more particularly pointed out in the accompanying description.

Referring now to the drawings:

Fig. 1 is a view of one form of apparatus embodying my invention.

Fig. 2 is an enlarged sectional view taken on line 2—2 of Fig. 1.

Fig. 3 is a view showing a modified construction.

Fig. 4 is a view showing one form of the cutters used.

Fig. 5 is a view showing another form of the cutters used.

Fig. 6 is a cross sectional view through the cutting device during the process of attaching the cutters thereto.

Fig. 7 is a view similar to Fig. 6 with the cutters in their cutting position.

Fig. 8 is a view showing the invention as applied to the cutting of coal or stone in the mine or quarry.

Like numerals refer to like parts throughout the several figures.

Figure 9:
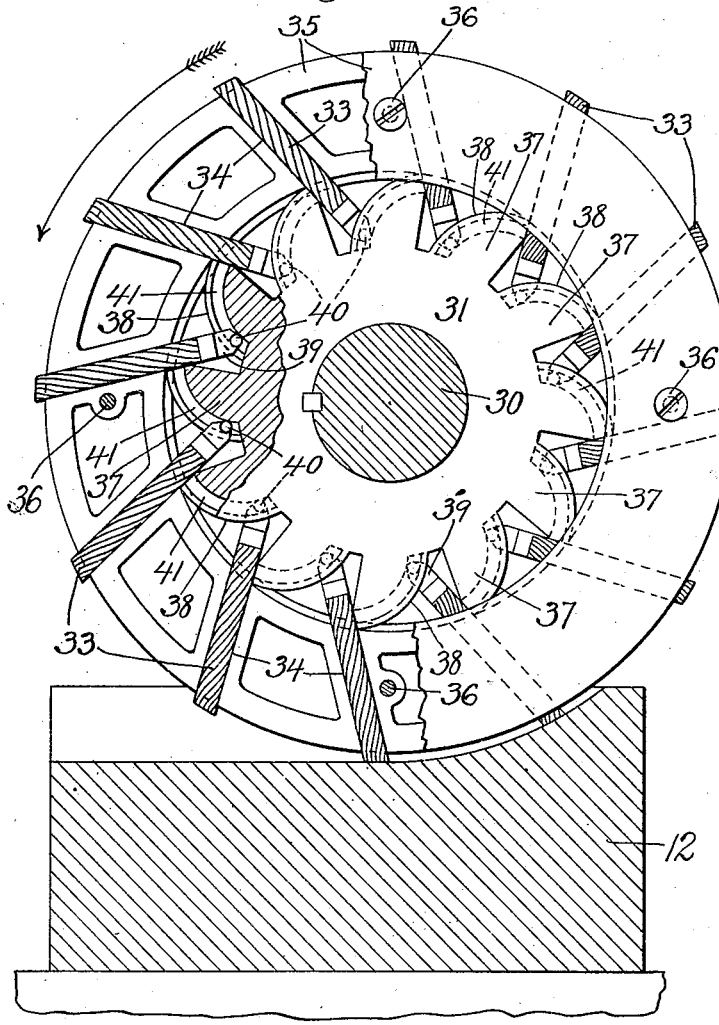
Fig. 9 is a side view of a further modified construction embodying the invention with parts in section.

Referring now to Figs. 1 and 2, I have shown a device particularly adapted for planing off or shaping hard material.

In this construction I provide a cutter with means for automatically maintaining the cutters in their cutting position as they are worn by use.

This cutting device consists of a driven member 1 to which are connected a series of cutters 2, said cutters projecting through openings in a member 3. The cutters 2 may be of various forms. In Fig. 4 I have shown these cutters as consisting of a series of metal pieces. These metal pieces may be entirely separated or may be connected together by the connecting piece 4, this piece being provided with a projecting engaging part 5 which fits into a receiving space 6 in the member 1. In the construction shown in Fig. 4, the projection 5 is secured by bending the end of the connecting piece 4.

The cutters are arranged so as to be sufficiently flexible to bend as noted in Fig. 2. In Fig. 5 I have shown a series of cutters $2^a$ made of metal wire wound into cables. These cutters may also be separate. I have shown them, however, as connected together by brazing or soldering, or suitable connecting material $4^a$, and portions thereof are preferably cut away to form a receiving space 6 and is provided with an engaging projection $5^a$ for engaging the member 1 by being inserted into the receiving opening $6^a$.

The member 3 is provided with a series of slots or openings 7, preferably arranged spirally as illustrated, through which the ends of the cutters project. The ends of the various openings 7 are preferably arranged in alignment circumferentially so that the cutters are distributed longitudinally over the entire cutting length of the device.

The member 1 is provided with the receiving openings $1^c$ (see Fig. 6) into which the cutters are received and which extend preferably only part way around the said member. The outer member 3 preferably fits more or less snugly around the member 1.

The member 1 is driven from any suitable source of power. For purposes of illustration I have shown the member 1 projecting beyond the member 3, there being a pinion 8 connected therewith which is driven by a gear 9 on the driving shaft 10 driven from any suitable source of power. The member 1 is suitably mounted in suitable supports 11 and the material 12 acted upon may be mounted upon a support 13, the support and the cutting device adapted to be moved relatively to feed the material to the cutters.

When power is applied to the member 1 the cutters are projected through the openings in the member 3 and engage the material 12 so as to cut it, the engagement with the material preventing the cutters from being projected too far beyond the member 3. The member 3, is, of course, rotated by the member 1 and the cutters 2. I prefer to provide some retarding means for resisting the rotation of the member 3 to facilitate the operation of the device by securing a proper projection of the cutters.

This may be accomplished by an elastic or spring connection. I have shown one form of this connection in Figures 1 and 2 which consists of a spring 14 which presses together two brake members 15 and 16 which engage the member 3. These brake members are preferably provided with brake blocks 15$^a$ and 16$^a$.

In Fig. 3 I have shown a modified construction for making ornamental devices. In this construction the member through which the cutters project is divided into a series of parts 17, 18 and 19 of different sizes so as to form various ledges or parts on the material 12. When the cutters of the form shown in Fig. 5 are used the member 1 is provided with an opening 6$^b$ for the engaging projection 5$^a$, and it is also preferably provided with an engaging projection 6$^c$ which fits into the receiving space 6.

Fig. 6 shows the parts at the beginning of the process of inserting the cutters and Fig. 7 shows the parts after the cutters are in position. In Fig. 8 I have shown a device for cutting such material as coal or stone or the like when in the mine or the quarry, for the purpose of assisting in removing the material. In this construction the cutting device will be of the same form as that shown in Figs. 1 to 7 and is rotated by a motor 20 and is moved along the face of the material in any suitable manner so as to under cut the same. As shown in this construction this movement is secured by means of a pulley 21 over which passes a flexible power transmitting device 22 fastened at its ends to fixed parts 23 and 24. This flexible power transmitting device preferably passes entirely around the pulley 21 and passes over a pulley 25 connected with an arm 26 associated with the motor support and also over pulley 27 associated with the motor support.

When the pulley 21 is rotated the motor and the cutting device are moved along the face of the material, the cutting device being rotated at the same time so as to under cut the material. The pulley 21 is rotated at the proper speed to properly feed the cutting device to the material. The cutters in this construction are automatically projected as they become worn and when the cutters become worn out they can be easily and quickly replaced.

This cutter can be arranged to cut the material in different ways, and I have simply shown it in the form illustrated in order to make the operation clear.

The device may be used to make vertical cuts, or cuts at the end of a tunnel, or in any other manner desired.

Figure 10:
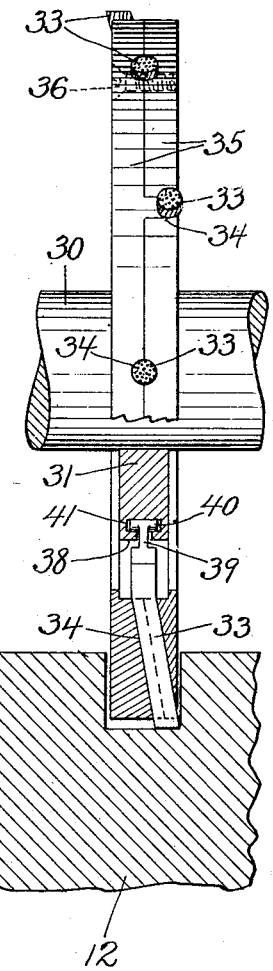
Fig. 10 is a view of the construction shown in Fig. 9 taken at right angles thereto.
Figure 11:
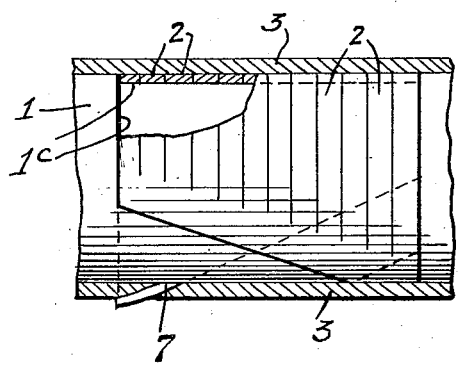
Fig. 11 is a fragmentary section through a portion of the device of Figure 1 taken at right angles to section of Figure 2.

In Figs. 9 and 10 I have shown a modified construction, the device being arranged to act as a saw. In this construction, there is the driven member consisting of the shaft 30 and the part 31 connected thereto so as to rotate therewith. The cutters 33 are connected to the part 31 and project through openings 34 in the member 35. The member 35 is preferably made in parts so that it may be opened up in placing the cutters therein or removing them therefrom, the parts being connected together by the fastening devices 36.

The part 31 has a series of projections 37 separated by spaces. Each projection has a curved face 38. The cutters are provided with the contracted portion or neck 39 and the enlarged holding part 40 which preferably consists of lateral members on each side of the neck 39. The projections 37 have slots 41 in which the holding parts 40 are received and along which the holding parts are free to slide.

In using the device as shown in Fig. 9, power is supplied to the shaft 30. As the cutters 33 wear away they are automatically projected by the relative movement of the part 31 and the member 35, the holding parts 40 moving toward the outer extremity slots 41.

When the holding members reach the outer extremity of these slots the cutters are renewed by removing the fastening devices 36 and taking out the cutters and replacing them with new ones. These cutters 33 are preferably arranged on the face of the saw so that their cutting ends will not all be in the same plane circumferentially; that is, they may be staggered as illustrated. For example, in Fig. 10, some of them are at the outer edges and others intermediate.

This device may be used for sawing stone or other hard material, or for making grooves therein.

It is desirable under certain conditions to dampen the cuttings produced by the apparatus when in operation thereby preventing such cuttings from becoming suspended in the air. This is important for purposes of health, and is also important under various conditions such as work in mines to prevent explosions.

I have illustrated one means of applying water to the cuttings. The water passes through an opening 42 in the member 1 (see Figs. 6 and 7) and passes from this opening through openings 43 to the cutters, and then passes along the cutters to the cutting surface and is thus supplied directly to the material cut away by the cutters. This water may be supplied to the member 1 in any desired manner as by a flexible hose 44.

It will thus be seen that the cuttings will be dampened and will thus not fly about or become suspended in the air.

Referring to Fig. 8 it is, of course, evident that any suitable means may be provided for rotating the pulley 21 and the cutting device. The pulley 21 must be rotated much slower than the cutting device and the parts will be arranged so that this rotation of the pulley 21 will be at the right speed to properly feed the machine forward to the material to be cut. For the purpose of illustration I have shown the pulley 21 driven by reducing gear from the motor 20.

I have described in detail a particular construction embodying the invention, but it is, of course, evident that the parts may be varied in many particulars without departing from the spirit of the invention as embodied in the claims hereto appended, and I therefore do not limit myself to the particular construction shown.

I claim:

1. A cutting apparatus comprising an inner driven member, a series of cutters connected therewith having cutting ends, means for driving said inner member so as to cause said cutting ends to cut the material, and an outer member surrounding the inner member and provided with openings through which the cutting ends of the cutters project so as to be in cutting relation to the material tained within said hollow member and having cutting ends, said cutting ends projecting through the periphery of said member so as to be in cutting relation to the material to be acted upon, and means for applying power to said cutters when the apparatus is in operation.

5. A cutting apparatus comprising an inner rotatable member, a series of flexible cutters at an angle to the axis of rotation of said inner member and connected therewith and having cutting ends, and an outer member provided with an opening through which the cutting ends of said cutters project so as to be in cutting relation to the material to be acted upon and means for preventing the flexing of the cutting ends of said flexible cutter when they are in operation.

6. A cutting apparatus comprising an inner rotatable member, a series of flexible cutters at an angle to the axis of rotation of said inner member and connected therewith, an outer member provided with an opening through which the ends of said cutters project, said openings extending in an inclined direction along the face of said outer member.

7. A cutting apparatus comprising a cutting device made up of a series of substantially parallel flexible cutters connected together at their ends so as to form a substantially continuous cut on the material acted upon.

8. A cutting apparatus comprising a cutting device made up of a series of flexible cutters connected together at their ends, an inner rotatable member with which the ends of said cutters are connected, an outer member provided with openings through which the ends of said cutters project.

9. A cutting apparatus comprising a cutting device made up of a series of flexible cutters connected together at their ends, an inner rotatable member with which the ends ing cutting ends, and an outer member provided with an opening through which the cutting ends of said cutters project and means for preventing the flexing of the cutting ends of said flexible cutters when in operation so as to maintain them in cutting relation to the material to be acted upon, the cutters connecting the outer member with the inner member so that it will rotate therewith.

12. A cutting apparatus comprising an inner driven member, a series of flexible cutters extending about said member at an angle to the axis of rotation thereof having cutting ends, an outer member provided with an opening through which the cutting ends of said cutters project and means for preventing the flexing of the cutting ends of said flexible cutters when in operation so as to maintain them in cutting relation to the material to be acted upon, the cutters connecting the outer member with the inner member so that it will rotate therewith, and means for retarding the rotation of said outer member.

13. A cutting apparatus comprising an inner driven member, a series of cutters connected therewith and having cutting ends, an outer member through which the cutting ends of said cutters project and means for maintaining said cutting ends in cutting relation to the material to be acted upon when the apparatus is in operation, the cutters connecting the outer member with the inner member so that the outer member is rotated thereby.

14. A cutting apparatus comprising an inner driven member, a series of cutters connected therewith and having cutting ends, an outer member through which the cutting ends of said cutters project and means for maintaining said cutting ends in cutting relation to the material to be acted upon when the apparatus is in operation, the cutters connecting the outer member with the inner member so that the outer member is rotated thereby, and resisting means associated with the outer member tending to resist the rotation thereof.

15. A cutting apparatus comprising an inner driven member, a series of cutters having engaging projections, said driven member provided with receiving openings for said projections, an outer member enclosing a portion of said cutters and having an opening through which the ends of said cutters project the cutters forming a driving connection between the inner driven member and the outer member.

16. A cutting apparatus comprising an inner driven member, a series of cutters having engaging projections, said driven member provided with receiving openings for said projections, an outer member enclosing a portion of said cutters and having an opening through which the ends of said cutters project the cutters forming a driving connection between the inner driven member and the outer member, and means for automatically feeding the cutters through said opening as they are worn to maintain them in their cutting position.

17. A cutting apparatus comprising an inner driven member, a series of cutters connected therewith having cutting ends, an outer member separate from the inner member and movable circumferentially with relation thereto, said outer member provided with an opening through which the ends of said cutters project and means for maintaining the cutting ends of said cutters in cutting relation with the material to be acted upon which the apparatus is in operation.

18. A cutting apparatus comprising an inner driven member, a series of cutters connected therewith having cutting ends, an outer member having an opening through which the ends of said cutters project, the cutters being fed through said opening as they are worn away by a relatively circumferential movement between the outer and inner members.

19. A cutting apparatus comprising an inner driven member, a series of cutters connected therewith having cutting ends and extending partway therearound, an outer member separate from the inner member and provided with openings through which the ends of the cutters project and means for maintaining the cutting ends of said cutters in cutting relation with the material to be acted upon when the apparatus is in operation, and means for supplying liquid at the ends of the cutters when in operation.

20. A cutting apparatus comprising an inner driven member, a series of cutters connected therewith and extending part way therearound, an outer member separate from the inner member and provided with openings through which the ends of the cutters project, said inner member being provided with a central, axial, extending opening into which water may be admitted and a radial opening communicating therewith and extend to the exterior of the inner member so as to discharge water between the inner and outer members and through the opening in the outer member.

Signed at Chicago, county of Cook and State of Illinois, this 7th day of March, 1925.

WARREN A. ROSS.